UNITED STATES PATENT OFFICE.

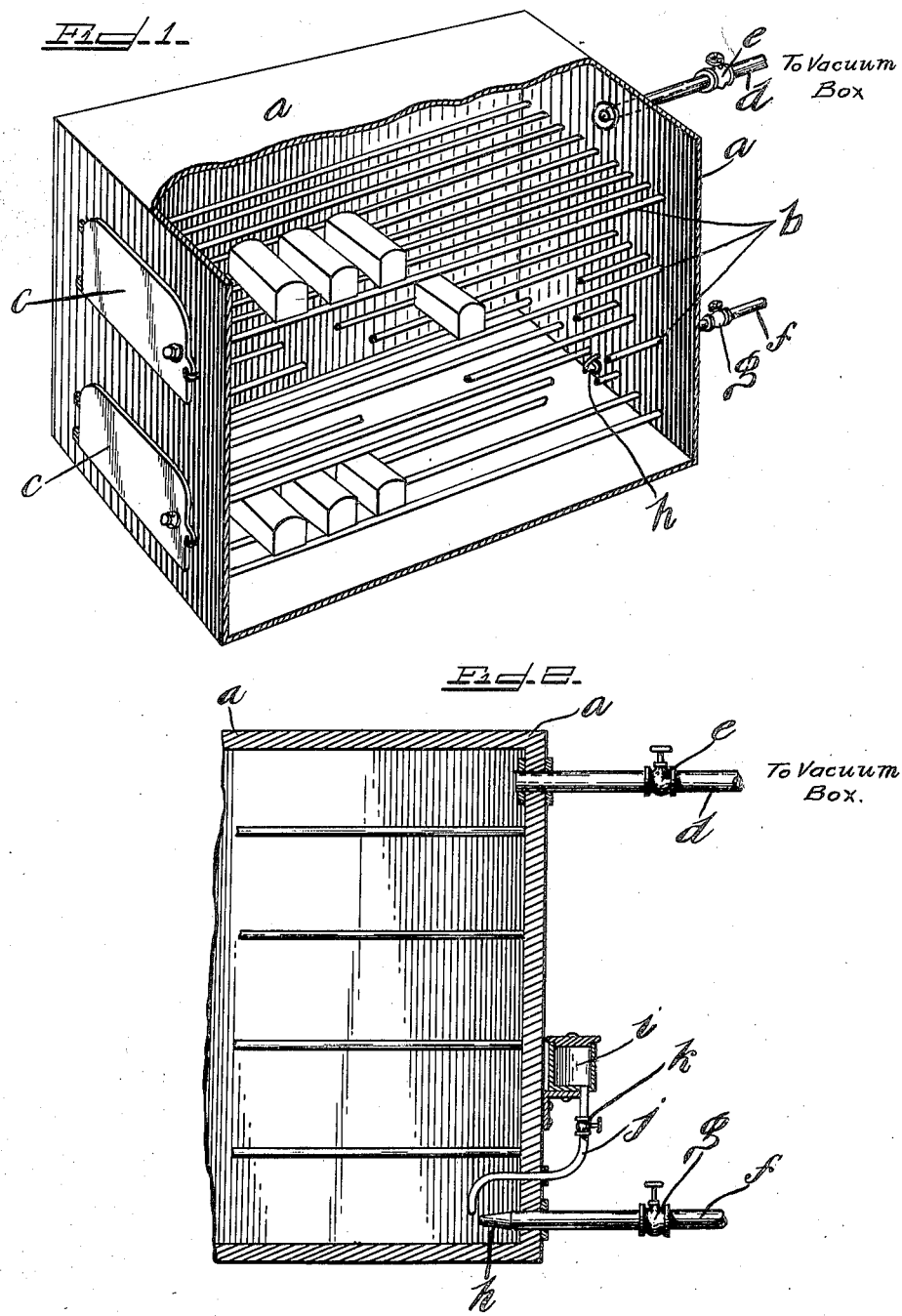

CHARLES STIRIZ, OF NEW YORK, N. Y.

ART OF TREATING DOUGH OR BAKE-SHOP PRODUCTS.

1,076,464.              Specification of Letters Patent.      Patented Oct. 21, 1913.

Application filed June 16, 1909. Serial No. 502,475.

*To all whom it may concern:*

Be it known that I, CHARLES STIRIZ, a citizen of the United States, residing in the borough of Manhattan, in the city, county, and State of New York, have invented certain new and useful Improvements in the Art of Treating Dough or Bake-Shop Products, of which the following is a specification, reference being had therein to the accompanying drawings, which form a part thereof.

My invention relates to an art or method of treating dough or bake-shop products for general use about a bake-shop, and more particularly to an art adapted to be used for preparing the dough for the oven and in preserving fresh bake-shop products and refreshing old products.

The main object of the invention is to provide an art or method of treating dough or dough products which will remove any impurities from the matter being treated through a reduction of pressure about same and the preservation, renewal or application of a gentle moist heat throughout said matter without cooking same.

A further object is to provide an art or method of treating dough or bake-shop products which may be used for expediting the raising of dough, for preserving moisture in fresh bake-shop products or in restoring moisture to bread or cake which has slightly deteriorated through aging, to impart thereto the characteristics of a fresh product which process in refreshing aged products will first remove any gases which may have been absorbed by, or formed in, the product during the aging thereof and a still further object is to provide an art or method whereby flavoring matter which may have been drawn from the products during the early steps in carrying out the process, or lost through the aging thereof may be restored to the product.

The invention consists in the novel manner of treating dough or dough products hereinafter set forth and described, and more particularly pointed out in the claims hereto appended.

Referring to the drawings: Figure 1 is a perspective view of an apparatus for carrying out my art or method, one side and a portion of the top thereof being broken away to disclose the interior thereof, and Fig. 2 is a vertical section of one end of the device showing the various pipe connections therewith.

Like letters refer to like parts in both of said views.

In the practice of my art or method of treating dough and the products thereof, I first reduce the pressure in a closed casing within which is located a batch of dough or a number of individual loaves of bread or cakes, the reduction of the pressure amounting to the creation of a partial vacuum within the casing serving to not only relieve the dough or the other articles from atmospheric pressure, but drawing air and gases from same for the purpose of not only removing the air or gases from the dough, bread or cake but with it any impurities, and at the same time permitting the expansion of the said dough or bread or cake more readily than could occur under atmospheric pressure. The partial vacuum is maintained within said casing for a sufficient period to bring the dough, bread, or cake to the desired condition, whereupon moist steam under low pressure, (of from three to four pounds) is introduced into said chamber in small volume thus subjecting the dough, bread, or cake to a moist heat, insufficient to cook, yet sufficient to thoroughly warm and moisten same throughout. The steam being admitted in small quantities and at low temperatures, excessive moisture will not be added to the matter within the closed casing, and the result will be to supply the heat necessary to rapidly raise the dough or the moist heat necessary to restore that moisture and warmth to the bread or cakes lost through slight aging. Any slight staleness of the bread or cake apparent to the taste, is entirely eliminated through the first step of the treatment, and the subsequent step has the effect of refreshing the bread or cake to bring it to a condition similar in appearance and taste to fresh baked bread. While subjecting the bread or dough to the action of the moist steam the vacuum connection may be left open, if desired, thus carrying from the casing a sufficient quantity of the moist steam to maintain a circulation through the box, and incidentally carrying away any impurities which may be absorbed or driven off by the steam about the matter being treated.

When treating dough by this process, I secure the twofold advantage of maintaining a moist, gentle heat about the dough and at the same time a reduced pressure, materially reducing the time required to raise a given quantity of dough. The partial vacuum first created about the dough prepares the dough for the subsequent treatment by the moist heat, which penetrating the mass of dough reaches all parts thereof causing a more rapid action of the yeast or baking powder. Incidentally this treatment prevents the souring of the dough through excessive temperatures, which frequently occurs during warm weather, and by reason of the moisture present when the dough is heated, there is no tendency to dry the surface of the dough or cook it, in a manner to interfere with the perfect raising thereof.

If it be desired to flavor the dough or the dough product being treated a flavoring extract in fluid form, is carried into the casing mixed with steam, thus causing this flavoring extract to be carried by the steam into the body of the dough or dough product and distributing the flavoring matter uniformly throughout same. This step in the treatment, by which the flavoring extract may be introduced to the dough or dough product, would be used ordinarily when refreshing cake, as the volatile nature of the flavoring matter would ordinarily lead to a considerable loss in the flavor or in the aged cake, due to the aging of the cake and the action of the partial vacuum and heat thereon in removing the volatile matter therefrom in the apparatus used for carrying out my herein described art or method.

The art or method is also applicable in connection with fresh bread with which it would be used to expedite the cooling thereof, in which connection I would use only the first step of the process for the purpose of removing steam and heated gas from the body of the bread until it had reached the desired temperature, thus reducing the time required before the bread, after being removed from the oven may be distributed.

By reducing the volume of steam, fresh bread may be kept warm for an indefinite period, thus preserving its freshness in the same manner as used for restoring the moisture and warmth thereto in refreshing.

The length of time during which the dough, bread, or cake must be subjected to each step of the art or method, is determined by the condition thereof, and the temperatures prevailing about the apparatus, which would also determine the volume of steam introduced to the casing.

The method or art heretofore described does not make the bread or cake soggy, but to secure the best results it is desirable after the matter being treated has been subjected to the moist heat for a sufficient period, to cut off the steam, and again create a partial vacuum within the casing to carry off steam not absorbed by the matter under treatment, and a portion of the steam and heated gases within the matter itself.

In the accompanying drawings I have shown an apparatus for carrying out my aforesaid process which apparatus consists of an outer air tight casing $a$ having therein a plurality of latticed shelves upon which the matter to be treated rests, these shelves consisting of a plurality of flat bars $b$ spaced apart sufficiently to provide ample space upon both sides of the matter to permit moist steam to have access to as large a superficial area thereof as possible. To facilitate the charging and discharging of the casing, I provide doors $c$ arranged so as to give access to all of the shelves $b$, said doors having a tight fit to permit the creation of a partial vacuum within the casing $a$ and prevent the escape of steam therefrom. Leading from the upper portion of the casing $a$ and in connection with a suction box or pump, not shown, is a pipe $d$ having therein a controlling valve $e$ by means of which the suction through said pipe may be controlled. Communicating with the lower portion of the casing $a$, is a steam pipe $f$ terminating in a discharge nozzle $h$ within the casing $a$ which steam pipe also has a controlling valve $g$ therein. This steam pipe leads to a boiler not shown in the drawings. It will thus be observed that when both valves $e$ $g$ are open either partially or wholly, a circulation of moist steam through the casing $a$ will be set up, and that the steam will pass upwardly through the space between the bars $b$ in passing to the pipe $d$.

Arranged exteriorly of the casing $a$, so as not to be subjected to the higher temperatures within said casing, is a receptacle $i$ for flavoring extract from which receptacle a pipe $j$ extends downwardly to a point adjacent to the discharge nozzle $h$ of the steam pipe $f$, thus causing the flavoring extract to be siphoned from the receptacle $i$ by the steam jet passing to the casing $a$. A suitable valve $k$ is provided in the pipe $j$ for controlling the flow of the flavoring extract therethrough.

In carrying out my aforesaid art or method in the apparatus above described, in treating dough, I place the pan containing the dough upon the shelves b, close the doors c and the valves g and h, and open the valve e. This will draw a sufficient volume of air from the casing a to materially reduce the pressure within same, and thus relieve the surface of the dough from atmospheric pressure. The valve g is then opened slightly, permitting a small volume of steam to flow and expand into the casing a. This steam by reason of the increased pressure, within the said casing, will not only moisten the surface of the dough slightly but will be forced into the mass thus imparting a higher temperature to the entire mass and expediting the raising thereof through a forcing of the action of the yeast therein. When the dough has been thoroughly heated, (and the moist heat of the steam will not tend to dry the surface thereof, cook the dough, or cause it to sour) and thoroughly impregnated with said moist steam, if desired, the supply of steam may be cut off and the pressure in the chamber again reduced in order to make the dough raise rapidly and increase the lightness of the bread produced therefrom.

When the apparatus is used for cooling freshly baked loaves, the said loaves are placed upon a shelf b, the valve g closed, the valve e opened, thus causing the suction through the pipe d to draw the heated gases and steam from the bread, rapidly lowering the temperature of the bread, and accomplishing in 15 minutes to half an hour that cooling which under normal conditions will require from one to two hours. Before the bread can be handled after removing from the oven, it is necessary to reduce the temperature to about 80 degrees and the treatment above specified not only expedites this cooling process, but prevents the bread from becoming soggy in case of an excess of moisture therein when removed from the oven.

In refreshing stale bread or cake, the bread or cake is placed upon the bars b and the casing closed to make the same air-tight. The valve e is then opened to create a partial vacuum within the casing thus drawing out, not only the air within the casing, but any volatile matter within the bread, serving to remove any gases which might give an unpleasant taste to the bread or cake. This partial vacuum is maintained for a short time until a large percentage of the gases in the bread or cake has been drawn therefrom, and thereupon the valve g is opened and steam is discharged into the casing a filling same and raising the pressure so as to cause the moist steam to thoroughly impregnate the bread or cake without, however, the presence of such a quantity of moisture as would make the same soggy either superficially or on the inside thereof.

This heat would tend to volatilize impure matter in the bread so as to throw off still further deleterious matter which would be absorbed by the steam in the chamber and carried therewith through the pipe d. Both pipes may be kept open for a short time for the purpose of carrying off such impurities, and then the valve e is closed to increase the quantity of moist steam and, raise the pressure within the casing; and force the steam more thoroughly through the entire mass of bread or cake. Before the bread has been wet by the steam to any substantial extent, the valve g is closed and the valve e again opened to remove the wet steam from the casing a and cool the bread or cake in the same manner as is employed with freshly baked bread or cake.

When it is desired to restore the flavoring matter to cake, the valve h is opened thus permitting the flavoring extract to be siphoned into the casing a and volatilized or mixed in a fine spray with the steam and be carried thereby into the bread or cake in the manner above referred to in connection with the refreshing of bread or cake.

Having described my invention, what I claim as new, and desire to have protected by Letters Patent, is:—

1. The herein described art or method of treating dough or dough products, consisting of creating a partial vacuum about the matter being treated by a continuing suction, whereby gases in the matter will be withdrawn therefrom and from about same, and impregnating said matter with a moist steam under low pressure.

2. The herein described art or method of treating dough or dough products, consisting of creating a partial vacuum about the matter being treated by a continuing suction, whereby gases in the matter will be withdrawn therefrom and from about same, and impregnating said matter with a moist steam under low pressure, and thereafter withdrawing a portion of the steam therefrom by a suction.

3. The herein described art or method of treating dough or dough products, consisting of first creating a partial vacuum about the matter being treated by suction, whereby gases in the matter will be withdrawn therefrom and from about same, thereafter circulating wet steam under low pressure about said matter, whereby said matter will become impregnated with said wet steam, and impurities freed by the heat will be carried from about said matter, and finally removing the steam from about said matter, and withdrawing a portion thereof therefrom.

4. The herein described art or method of treating dough or dough products, consisting of first creating a partial vacuum about the matter being treated, by suction, whereby gases in the matter will be withdrawn therefrom and from about same, thereafter circulating wet steam under low pressure about said matter, and carrying therein or therewith a flavoring matter, whereby said matter will become impregnated with said wet steam, and impurities freed by the heat will be carried from about said matter and finally removing the steam from about said matter, and withdrawing a portion thereof therefrom.

In witness whereof, I have hereunto affixed my signature, this 12th day of June, 1909, in the presence of two witnesses.

CHARLES STIRIZ.

Witnesses:
 AARON GINSBERG,
 P. F. SONNEK.